United States Patent
Amako et al.

(10) Patent No.: US 8,962,091 B2
(45) Date of Patent: *Feb. 24, 2015

(54) POLYHETEROSILXOANES FOR HIGH REFRACTIVE INDEX MATERIALS

(75) Inventors: Masaaki Amako, Chiba (JP); Maki Itoh, Tokyo (JP); Nanguo Liu, Midland, MI (US); Shawn Keith Mealey, Midland, MI (US); Randall Gene Schmidt, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/885,693

(22) PCT Filed: Jan. 5, 2012

(86) PCT No.: PCT/US2012/020268
§ 371 (c)(1),
(2), (4) Date: May 16, 2013

(87) PCT Pub. No.: WO2012/094450
PCT Pub. Date: Jul. 12, 2012

(65) Prior Publication Data
US 2013/0230656 A1    Sep. 5, 2013

Related U.S. Application Data

(60) Provisional application No. 61/429,957, filed on Jan. 5, 2011.

(51) Int. Cl.
*B05D 3/02* (2006.01)
*C09D 185/00* (2006.01)
*C09D 183/14* (2006.01)
*C08G 77/00* (2006.01)
*C08L 83/04* (2006.01)
*C08L 85/00* (2006.01)
*C08G 77/58* (2006.01)
*G02B 1/04* (2006.01)
*C08G 79/14* (2006.01)

(52) U.S. Cl.
CPC ............... *C09D 185/00* (2013.01); *B05D 3/02* (2013.01); *C09D 183/14* (2013.01); *C08G 77/80* (2013.01); *C08L 83/04* (2013.01); *C08L 85/00* (2013.01); *C08G 77/58* (2013.01); *G02B 1/04* (2013.01); *C08G 79/14* (2013.01)
USPC ............... 427/387; 524/588; 524/858; 528/9; 528/29

(58) Field of Classification Search
None
See application file for complete search history.

(56) References Cited

U.S. PATENT DOCUMENTS

| | | | |
|---|---|---|---|
| 4,361,691 A | 11/1982 | Yajima et al. | |
| 4,455,414 A | 6/1984 | Yajima et al. | |
| 4,746,366 A * | 5/1988 | Philipp et al. | 106/287.19 |
| 5,401,528 A * | 3/1995 | Schmidt | 427/2.26 |
| 5,563,228 A * | 10/1996 | Ogawa et al. | 528/20 |
| 5,668,237 A * | 9/1997 | Popall et al. | 528/9 |
| 5,756,628 A | 5/1998 | Tani et al. | |
| 6,676,740 B2 | 1/2004 | Matsumura et al. | |
| 7,052,770 B2 | 5/2006 | Furuya et al. | |
| 7,652,157 B2 | 1/2010 | Kniajanski et al. | |
| 2003/0216537 A1 | 11/2003 | Friedrich | |
| 2004/0242740 A1 * | 12/2004 | Ryang | 524/183 |
| 2012/0101222 A1 | 4/2012 | Horstman et al. | |

FOREIGN PATENT DOCUMENTS

| | | |
|---|---|---|
| EP | 0327311 | 9/1994 |
| EP | 2157624 | 2/2010 |
| JP | 2002179794 | 6/2002 |
| WO | 2011002826 | 1/2011 |

* cited by examiner

*Primary Examiner* — Erma Cameron
(74) *Attorney, Agent, or Firm* — Howard & Howard Attorneys PLC

(57) ABSTRACT

Polyheterosiloxane compositions are disclosed containing at least 70% by weight of the following components: (A) a first metal (M1) selected from Ti, Zr, or Zn, (B) a second metal (M2) selected from a non-lanthanide metal, (C) siloxy units having the formula $R_2SiO_{2/2}$ or $R'SiO_{3/2}$, where R' is independently a hydrocarbon group or halogen substituted hydrocarbon group containing 1 to 18 carbon atoms. The disclosed compositions are useful to prepare high refractive index materials.

17 Claims, No Drawings

US 8,962,091 B2

POLYHETEROSILXOANES FOR HIGH REFRACTIVE INDEX MATERIALS

CROSS REFERENCE TO RELATED APPLICATIONS

This application is a U.S. national stage filing under 35 U.S.C. §371 of PCT Application No. PCT/US12/20268 filed on Jan. 5, 2012, which claims the benefit of U.S. Patent Application No. 61/429,957 filed Jan. 5, 2011 under 35 U.S.C. §119 (e). PCT Application No. PCT/US12/20268 and U.S. Patent Application No. 61/429,957 are hereby incorporated by reference.

BACKGROUND OF THE INVENTION

High refractive index (RI) materials are of particular interest for a wide variety of applications in cosmetics, optical disks, diffraction gratings, optical fiber coatings, anti-reflection coatings, imaging sensors, light-emitting diodes (LED), waveguides, optical switches, lenses, and flat panel displays. There is a continuing need to identify high RI materials with high transparency and low birefringence.

BRIEF SUMMARY OF THE INVENTION

The present disclosure provides polyheterosiloxane compositions useful in high refractive index (HRI) materials. The polyheterosiloxane compositions comprise at least 70% by weight of:
  (A) a first metal (M1) selected from Ti, Zr, or Zn,
  (B) a second metal (M2) selected from a non-lanthanide metal,
  (C) siloxy units having the formula $R^1_2SiO_{2/2}$ or $R^1SiO_{3/2}$ where $R^1$ is independently a hydrocarbon group or halogen substituted hydrocarbon group containing 1 to 30 carbon atoms,
wherein; the mole fraction of components (A), (B), and (C) in the polyheterosiloxane composition relative to each other is of the formula $[M1]_a[M2]_b[R^1_2SiO_{2/2}]_c[R^1SiO_{3/2}]_d$
  where
    a may vary from 0.10 to 0.7,
    b may vary from 0.001 to 0.5,
    c may vary from zero to 0.9,
    d may vary from zero to 0.9,
  with the provisos that c and d both cannot be zero,
    and the sum of a+b+c+d≈1,
  the polyheterosiloxane composition is soluble in an aromatic hydrocarbon solvent.

DETAILED DESCRIPTION OF THE INVENTION

The polyheterosiloxane compositions of the present invention contain at least 70% by weight of the following components:
  (A) a first metal (M1) selected from Ti, Zr, or Zn,
  (B) a second metal (M2) selected from a non-lanthanide metal,
  (C) siloxy units having the formula $R'_2SiO_{2/2}$ or $R'SiO_{3/2}$,
each of which are described in detail as follows.
(A) The First Metal (M1)
  Component (A) of the polyheterosiloxane composition is a first metal described by M1 which may be selected from all non-lanthanide metals in the Periodic Table of Elements, providing the metal selected for M1 is different from the second metal (M2). Alternatively M1 is selected from those metals of the Periodic Table of Elements known for providing high RI properties. Alternatively, M1 is Ti, Zr, or Zn, alternatively M1 is Ti or Zr, alternatively M1 is Ti.

The oxidation state of M1 may independently range from 1 to 7. Alternatively, the oxidation state of M1 independently ranges from 1 to 5. Alternatively 4 to 5. M1 in the polyheterosiloxane compositions may have the same or different oxidation states.

In the polyheterosiloxane compositions, M1 may be bonded to other M1 components, M2 components, and/or other various organopolysiloxane segments. When bonded to other M1 or M2 components, the metals may be linked via oxygen, such as M1-O-M2.

Besides having bonds to components (A), (B) or (C), M1 may have a variety of substituents bonded to it in the present polyheterosiloxane compositions. These substituents may be residual or un-reacted substituents present on the metal atom in the starting compound used to prepare the polyheterosiloxane, which is discussed below. The amount of M1 present in the polyheterosiloxane compositions may vary, providing the amounts are within the mole fractions as detailed below.

(B) The Second Metal (M2)

Component (B) of the polyheterosiloxane composition is a second metal described by M2 which may be selected from any non-lanthanide elements of the Periodic Table of Elements, providing that the second metal M2 is different from the first metal Ml. Alternatively, M2 is selected from Ti, Al, Ge, Zr, Sn, Ca, Ba, Sb, Ga, Hf, In, Mg, Mo, Nb, Y, Sr, Ta, Te, W, and V. Alternatively, M2 is Ti, Zr, Ca, Mg, Al, Ge, Ta, Nb, and Sn. Alternatively, M2 is Zn, Zr, Ca, Mg, or Ba.

The oxidation state of M2 may independently range from 1 to 7. Alternatively, the oxidation state of M2 independently ranges from 1 to 5. M2 in the polyheterosiloxane compositions may have the same or different oxidation states.

In the polyheterosiloxane compositions, M2 may be bonded to other M1 components, M2 components, and/or other various organopolysiloxane segments. When bonded to other M1 or M2 components, the metals may be linked via oxygen, such as M1-O-M2.

Besides having bonds to components (A), (B), or (C), M2 may have a variety of substituents bonded to it in the present polyheterosiloxane compositions. These substituents may be residual or un-reacted substituents present on the metal atom in the starting compound used to prepare the polyheterosiloxane, which is discussed below.

The amount of M2 present in the polyheterosiloxane compositions may vary, providing the amounts are within the mole fractions as detailed below.

(C) Siloxy Units Having the Formula $R_2SiO_{2/2}$ or $RSiO_{3/2}$

The polyheterosiloxane compositions of the present invention contain at least some portion that may be considered as organopolysiloxane segments. Organopolysiloxanes are polymers containing siloxy units independently selected from $(R_3SiO_{1/2})$, $(R_2SiO_{2/2})$, $(RSiO_{3/2})$, or $(SiO_{4/2})$ siloxy units, where R may be any monovalent organic group, alternatively R is a hydrocarbon group containing 1 to 18 carbons, alternatively R is an alkyl group containing 1 to 12 carbon atoms, or alternatively R is methyl or phenyl. These siloxy units are commonly referred to as M, D, T, and Q units respectively. Their molecular structures are listed below:

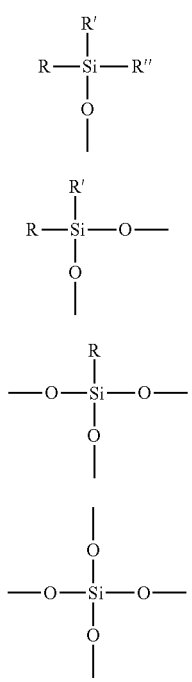

These siloxy units can be combined in various manners to form cyclic, linear, or branched structures. The chemical and physical properties of the resulting polymeric structures vary depending on the number and type of siloxy units in the organopolysiloxane.

The polyheterosiloxane compositions of the present invention contain organopolysiloxane segments composed of D or T siloxy units, that is siloxy units having the formula $R'_2SiO_{2/2}$ or $R'SiO_{3/2}$. The organopolysiloxane segments may contain other siloxy units, that is any combination of M, D, T, or Q siloxy units, providing at least one D or T unit is present in the organopolysiloxane having the formula $R'_2SiO_{2/2}$ or $R'SiO_{3/2}$. In these siloxy formulae, R' is independently a hydrocarbon group or halogen substituted hydrocarbon group containing 1 to 18 carbon atoms. These hydrocarbon groups may have from 1 to 18 carbon atoms, alternatively from 1 to 12 carbon atoms, and are exemplified by, but not limited to alkyl groups such as methyl, ethyl, propyl, butyl, pentyl, hexyl, heptyl, octyl, undecyl, and octadecyl; cycloalkyl such as cyclohexyl; aryl such as phenyl, tolyl, xylyl, benzyl, and 2-phenylethyl; and halogenated hydrocarbon groups such as 3,3,3-trifluoropropyl, 3-chloropropyl, and dichlorophenyl.

The number of siloxy units present in any given organopolysiloxane segment of the polyheterosiloxane composition may vary, providing the amounts are within the mole fractions as detailed below. The number and type of siloxy units present will affect the molecular weight of the organopolysiloxane segment, and hence the molecular weight of the polyheterosiloxanes.

In one embodiment, the organopolysiloxane segments of the polyheterosiloxane composition are composed primarily of $R'SiO_{3/2}$ siloxy units where R' is phenyl.

In another embodiment, the organopolysiloxane segments of the polyheterosiloxane composition are composed primarily of $R'_2SiO_{2/2}$ siloxy units where one R' substituent is phenyl, and the other R' substituent is methyl.

In another embodiment, the organopolysiloxane segments of the polyheterosiloxane composition are composed primarily of $R'_2SiO_{2/2}$ siloxy units where both R' substituents are phenyl.

In another embodiment, the organopolysiloxane segments of the polyheterosiloxane composition is composed primarily of a combination of $R'_2SiO_{2/2}$ and $R'SiO_{3/2}$ siloxy units where one R' substituent in the $R'_2SiO_{2/2}$ siloxy unit is phenyl, and the other R' substituent is methyl, R' is phenyl in the $R'SiO_{3/2}$ siloxy unit.

In another embodiment, the organopolysiloxane segments of the polyheterosiloxane composition is composed primarily of a combination of $R'_2SiO_{2/2}$ and $R'SiO_{3/2}$ siloxy units where both R' substituents in the $R'_2SiO_{2/2}$ siloxy unit are phenyl, and R' is phenyl in the $R'SiO_{3/2}$ siloxy unit.

The polyheterosiloxane compositions of the present invention contain at least 70%, alternatively 80%, alternatively 90%, alternatively 95%, or alternatively 98% by weight of components (A), (B), and (C) as described above.

The amount of components (A), (B), and (C) in the present polyheterosiloxane compositions may vary. For purposes of the present invention, the varied amounts of each is described by defining the mole fractions of each component relative to the total number of moles of components (A), (B), and (C) present in the polyheterosiloxane composition. Thus, the mole fraction of components (A), (B), and (C) in the polyheterosiloxane composition relative to each other is of the formula $[M1]_a[M2]_b[R'_2SiO_{2/2}]_c[R'SiO_{3/2}]_d$ where a may vary from 0.010 to 0.7,
  alternatively from 0.1 to 0.6,
  alternatively from 0.2 to 0.5,
b may vary from 0.001 to 0.5,
  alternatively from 0.01 to 0.3,
  alternatively from 0.05 to 0.25,
c may vary from zero to 0.9,
  alternatively from 0.1 to 0.6,
  alternatively from 0.2 to 0.5,
d may vary from zero to 0.9,
  alternatively from 0.1 to 0.5,
  alternatively from 0.1 to 0.3,
with the provisos that c and d both cannot be zero, and the sum of $a+b+c+d \approx 1$.

The terminology "≈" describes that the sum of a+b+c+d is approximately equal to 1. For example, in various embodiments, the sum may be 0.99, 0.98, 0.97, 0.96, 0.95, etc. If the sum does not equal 1, then the polyheterosiloxane composition may include residual amounts of groups that are not described by the aforementioned formula.

The number of moles of each component in the polyheterosiloxane composition may be determined using common analytical techniques. The number of moles of both M1 and M2 in the polyheterosiloxane composition may be determined using common elemental analysis techniques. The number of moles of the siloxy units may be determined by $^{29}$Si NMR. Alternatively, the number of moles of each component may be calculated from the amounts of each used in the process to prepare the polyheterosiloxane, and accounting for any losses (such as removal of volatile species) that may occur during the process to produce the polyheterosiloxane.

While not being limited to any theory, the present inventors believe the polyheterosiloxane compositions to be composed of a complex mixture of various heterosiloxane structures. It is believed that the polyheterosiloxane compositions contain various polymeric structures with Si—O—Si, Si—O-M1, M1-O-M1, and M1-O-M2 linkages as well as Si—O-M2 and M2-O-M2 linkages. However, the concentration of metal to metal links (M1-O-M1, M1-O-M2, M2-O-M2) are controlled so as to prevent the formation of metal aggregates or particles of sufficient size to either render the polyheterosiloxanes insoluble in organic solvents, or are of insufficient size to be detected using TEM techniques. Residual alkoxide (—OR) groups also exist on polyheterosiloxane structures and are mainly bonded to M1 and Si, as evidenced by $^{29}$Si and $^{13}$C NMR and the solubility of the present polyheterosiloxane compositions in an aromatic solvent. The present polyheterosiloxanes may contain from 1% to 20% by weight alkoxy groups, alternatively, from 5% to 15% by weight alkoxy groups. Residual counter ions from the metal salts (M2) may also be present and are believed to be bonded or chelated to M1 and M2.

The present polyheterosiloxane compositions are typically soluble in many organic solvents. In particular, the present polyheterosiloxane compositions are soluble in an aromatic hydrocarbon solvent. As used herein, "soluble" means the present polyheterosiloxane compositions dissolve in toluene to form a homogeneous solution having a concentration of at least 1 weight percent of the polyheterosiloxane at 23° C., alternatively having a concentration of at least 5 weight percent of the polyheterosiloxane in toluene at 23° C., alternatively having a concentration of at least 10 weight percent of the polyheterosiloxane in toluene at 23° C., alternatively having a concentration of at least 20 weight percent of the polyheterosiloxane in toluene at 23° C. The present polyheterosiloxane compositions may also be soluble in other types of organic solvents, such as chloroform, carbon tetrachloride, THF, and butyl acetate.

The polyheterosiloxanes have molecular weights (weight average) ranging from 1000 to 1,000,000 g/mole, alternatively from 2,000 to 400,000 g/mole, alternatively from 2,000 to 200,000 g/mole. The molecular weights may be determined using modified GPC techniques to eliminate possible interactions between the sample and the column system. For example, the molecular weights may be determined by GPC analysis using triple detectors (light scattering, refractometer, and viscometer) with a column (PL 5u 100a 100×7.8 mm) designed for rapid analysis or Flow Injection Polymer Analysis (FIPA).

The present polyheterosiloxane compositions may include "metal-rich" domains and "siloxane-rich" domains. As used herein "metal-rich" domains describes the structural segments of the polyheterosiloxane compositions where a plurality of linking bonds contain M1 or M2 (that is M1-O-M1, M1-O-M2, M2-O-M2, M1-O—Si, or M2-O—Si). As used herein "siloxane-rich" refers to the structural segments of the polyheterosiloxane compositions where a plurality of linking bonds are siloxane (Si—O—Si) bonds. However, the present inventors believe the "metal-rich" domains are such that the amount of metal to metal links (M1-O-M1, M1-O-M2, M2-O-M2) are minimized so as to prevent the formation of metal aggregates or particles of sufficient size to prevent their solubility in aromatic hydrocarbons, as discussed above.

Alternatively, the metal rich domain may not be of sufficient size to be observed using high resolution transmission electron micrograph (TEM). Thus in certain embodiments, the M1 and M2 metals are sufficiently distributed in the polyheterosiloxane compositions and have a domain size smaller than 10 nanometers, alternatively smaller than 5 nanometers, or alternatively smaller than 2 nanometers (detection limits for the TEM).

The present polyheterosiloxane compositions may be prepared by the methods as taught in PCT application No. PCT/US10/40510, which is incorporated by reference. The present polyheterosiloxanes may be prepared by reacting (A') at least one metal (M1) alkoxide containing Ti, Zr, or Zn, (B') at least one hydrolyzable metal (M2) salt selected from a non-lanthanide metal series of the Periodic Table, and (C') at least one silicon-containing material, with an amount of water that provides between 50 and 200% necessary to hydrolyze and condense the alkoxy groups and other hydrolyzable groups on Components (A'), (B'), and (C'), to form the present polyheterosiloxane compositions.

Component (A') comprises at least one metal alkoxide containing Ti, Zr, or Zn. The metal alkoxide may be selected from metal alkoxides having a general formula (I) $R^1_m M1O_n X_p (OR^2)_{v1-m-p-2n}$, where M1 is selected from Ti, Zr, and Zn, each X is independently selected from carboxylate ligands, organosulfonate ligands, organophosphate ligands, β-diketonate ligands, and chloride ligands, subscript v1 is the oxidation state of M1, m is a value from 0 to 3, n is a value from 0 to 2, p is a value from 0 to 3, each $R^1$ is a monovalent alkyl group having from 1 to 18 carbon atoms, each $R^2$ is an independently selected monovalent alkyl group having from 1 to 6 carbon atoms, aryl group having from 6 to 8 carbon atoms, or a polyether group having a general formula (VI) —$(R^3O)_q R^4$, where q is a value from 1 to 4, each $R^3$ is an independently selected divalent alkylene group having from 2 to 6 carbon atoms, $R^4$ is an independently selected hydrogen atom or monovalent alkyl group having from 1 to 6 carbon atoms.

In Formula (I), $R^1$ is a monovalent alkyl group having from 1 to 18 carbon atoms. Examples of the alkyl group of $R^1$ include methyl, ethyl, propyl, isopropyl, butyl, t-butyl, hexyl, octyl, decyl, dodecyl, hexadecyl, and octadecyl. Alternatively, the alkyl group comprises 1 to 8 carbon atoms. Alternatively, the alkyl group is methyl, ethyl, propyl, butyl, hexyl, and octyl.

In Formula (I), each $R^2$ is an independently selected monovalent alkyl group having from 1 to 6 carbon atoms, aryl group having from 6 to 8 carbon atoms, or a polyether group having a general formula (VI) —$(R^3O)_q R^4$, where q is a value from 1 to 4, each $R^3$ is an independently selected divalent alkylene group having from 2 to 6 carbon atoms, $R^4$ is an independently selected hydrogen atom or monovalent alkyl group having from 1 to 6 carbon atoms.

Examples of the alkyl groups of $R^2$ include methyl, ethyl, propyl, isopropyl, butyl, t-butyl, and hexyl. Examples of the aryl groups of $R^2$ include phenyl and benzyl.

Examples of the divalent alkylene group having from 2 to 6 carbon atoms of $R^3$ include —$CH_2CH_2$— and —$CH_2CH(CH_3)$—. Examples of the alkyl groups having from 1 to 6 carbon atoms of $R^4$ are as described above for $R^2$. Subscript q in Formula (VI) is a value from 1 to 4, alternatively 1 to 2. Examples of the polyether group of Formula (VI) include methoxyethyl, methoxypropyl, methoxybutyl, ethoxyethyl, ethoxypropyl, ethoxybutyl, methoxyethoxyethyl, and ethoxyethoxyethyl.

Alternatively, $R^2$ is an alkyl group having from 1 to 6 carbon atoms, alternatively ethyl, propyl, and butyl, alternatively propyl and butyl.

In Formula (I), X is selected from carboxylate ligands, organosulfonate ligands, organophosphate ligands, β-diketonate ligands, and chloride ligands, alternatively carboxylate ligands and β-diketonate ligands. The carboxylate ligands useful for X have a formula $R^{15}COO^-$ where $R^{15}$ is selected from hydrogen, alkyl groups, alkenyl groups, and aryl groups. Examples of useful alkyl groups for $R^{15}$ include alkyl groups having from 1 to 18 carbon atoms, alternatively 1 to 8 carbon atoms as described above for $R^1$. Examples of useful alkenyl groups for $R^{15}$ include alkenyl groups having from 2 to 18 carbon atoms, alternatively 2 to 8 carbon atoms such as vinyl, 2-propenyl, allyl, hexenyl, and octenyl. Examples of useful aryl groups for $R^{15}$ include aryl groups having from 6 to 18 carbon atoms, alternatively 6 to 8 carbon atoms such as phenyl and benzyl. Alternatively R$^{15}$ is methyl, 2-propenyl, allyl, and phenyl. The β-diketonate ligands useful for X can have the following structures:

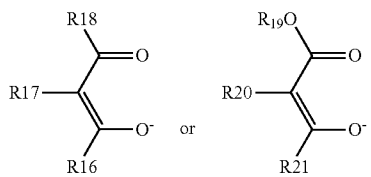

where R$^{16}$, R$^{18}$, and R$^{21}$ are selected from monovalent alkyl and aryl groups. Examples of useful alkyl groups for R$^{16}$, R$^{18}$, and R$^{21}$ include alkyl groups having from 1 to 12 carbon atoms, alternatively 1 to 4 carbon atoms such as methyl, ethyl, trifluoromethyl, and t-butyl. Examples of useful aryl groups for R$^{16}$, R$^{18}$, and R$^{21}$ include aryl groups having from 6 to 18 carbon atoms, alternatively 6 to 8 carbon atoms such as phenyl and tolyl. R$^{19}$ is selected from alkyl groups, alkenyl groups and aryl groups. Examples of useful alkyl groups for R$^{19}$ include C1 to C18 alkyl groups, alternatively C1 to C8 alkyl groups such as methyl, ethyl, propyl, hexyl and octyl. Examples of useful alkenyl groups for R$^{19}$ include alkenyl groups having from 2 to 18 carbon atoms, alternatively C2 to C8 carbon atoms such as allyl, hexenyl, and octenyl. Examples of useful aryl groups for R$^{19}$ include aryl groups having from 6 to 18 carbon atoms, alternatively 6 to 8 carbon atoms such as phenyl and tolyl. R$^{17}$ and R$^{20}$ are hydrogen or alkyl, alkenyl, and aryl groups. Examples of useful alkyl groups for R$^{17}$ and R$^{20}$ include alkyl groups having from 1 to 12 carbon atoms, alternatively 1 to 8 carbon atoms such as methyl and ethyl. Examples of useful alkenyl groups for R$^{17}$ and R$^{20}$ include alkenyl groups having from 2 to 18 carbon atoms, alternatively 2 to 8 carbon atoms such as vinyl, allyl, hexenyl, and octenyl. Examples of useful aryl groups for R$^{17}$ and R$^{20}$ include aryl groups having from 6 to 18 carbon atoms, alternatively 6 to 8 carbon atoms such as phenyl and tolyl. R$^{16}$, R$^{17}$, R$^{18}$, R$^{19}$, R$^{20}$, and R$^{21}$ are each independently selected and can be the same or different.

In Formula (I), subscript v1 is the oxidation state of M1, ranging from 1 to 7. Alternatively, v1 ranges from 1 to 5.

In Formula (I), subscript m is a value from 0 to 3, alternatively 0 to 2, alternatively 0.

In Formula (I), subscript n is a value from 0 to 2, alternatively 0 to 1, alternatively 0.

In Formula (I), subscript p is a value from 0 to 3, alternatively 0 to 2, alternatively 0.

Examples of the metal alkoxides described by Formula (I) useful in the present method include titanium tetrapropoxides, titanium tetrabutoxides, zirconium tetrapropoxides, and zirconium tetrabutoxides from DuPont, aluminum tripropoxides, titanium ethoxide, titanium 2-ethylhexoxide, titanium methoxide, titanium methoxypropoxide, titanium n-nonyloxide, zinc methoxyethoxide, zirconium ethoxide, zirconium 2-ethylhexoxide, zirconium 2-methyl-2-butoxide, and zirconium 2-methoxymethyl-2-propoxide, titanium allylacetoacetate triisopropoxide, titanium bis(triethanolamine)diisopropoxide, titanium chloride triisopropoxide, titanium dichloride diethoxide, titanium diisopropoxy bis(2,4-pentanedionate), titanium diisopropoxide bis(tetramethylheptanedionate), titanium diisopropoxide bis(ethylacetoacetate), titanium methacrylate triisopropoxide, titanium methacryloxyethylacetoacetate triisopropoxide, titanium trimethacrylate methoxyethoxyethoxide, titanium tris(dioctylphosphato)isopropoxide, titanium tris(dodecylbenzenesulfonate)isopropoxide, zirconium (bis-2,2'-(alloxymethyl)-butoxide)tris(dioctylphosphate), zirconium diisopropoxide bis(2,2,6,6-tetramethyl-3,5-heptanedionate), zirconium dimethacrylate dibutoxide, zirconium methacryloxyethylacetoacetate tri-n-propoxide.

In one embodiment, component (A') is selected from titanium tetraisopropoxide, titanium tetrabutoxide, or zirconium tetrabutoxide.

Alternatively, component (A') may be selected from a polymer resulting from the partial hydrolysis and condensation of the metal alkoxides as described above. In this embodiment, component (A') may be a butyl titanate polymer (DuPont TYZOR® brand BTP), propyl titanate polymer, isopropyl titanate polymer, sec-butyl titanate polymer, tert-butyl titanate polymer, or zirconate polymers with similar substituents.

Component (B') may comprise at least one metal (M2) salt selected from (B'1) a non-hydrated metal salt having a general formula (IV) R$^7_e$M2(Z)$_{(v2-e)/w}$ or (B'2) a hydrated metal salt having a general formula (V) M2(Z)$_{v2/w}$·xH$_2$O, where M2 is selected from any of the non-lanthanide metals in the Periodic Table of The Elements, v2 is the oxidation state of M2, w is the oxidation state of ligand Z where Z is independently chosen from carboxylates, β-diketonates, fluoride, chloride, bromide, iodide, organic sulfonate, nitrate, nitrite, sulphate, sulfite, cyanide, phosphites, phosphates, organic phosphites, organic phosphates, and oxalate, each R$^7$ is an independently selected alkyl group having 1 to 18 carbon atoms, alkenyl group having from 2 to 8 carbon atoms, or aryl group having from 6 to 8 carbon atoms, e is a value from 0 to 3 and x is a value from 0.5 to 12 and describes the average number of H$_2$O molecules associated with each metal salt molecule.

In Formulas (IV) and (V), the metal element described by M2 is selected from any of the non-lanthanide metals in the Periodic Table of Elements. Alternatively, M2 is Zn, Zr, or Ba.

In Formulas (IV) and (V), subscript v2 is the oxidation state of M2 and can range from 1 to 7, alternatively 1 to 4.

In Formulas (IV) and (V), subscript w is the oxidation state of ligand Z and can range from 1 to 3, alternatively 1 to 2.

The Z group in Formulas (IV) and (V) describes the various counter ligands attached to the metal element (M2). Generally, each Z is independently selected from carboxylate ligands, β-diketonate ligands, fluoride ligand, chloride ligand, bromide ligand, iodide ligand, organic sulfonate ligands, nitrate ligand, nitrite ligand, sulphate ligand, sulfite ligand, cyanide ligand, phosphate ligand, phosphite ligand, organic phosphite ligands, organic phosphate ligands, and oxalate ligand.

The carboxylate ligands and β-diketonate ligands useful for Z are as described above for X.

The organic sulfonate ligands useful for Z have a formula R$^{22}$SO$_3^-$, where R$^{22}$ is selected from monovalent alkyl groups, alkenyl groups and aryl groups. Examples of useful alkyl groups, alkenyl groups and aryl groups are as described above for R$^{15}$. Alternatively R$^{22}$ is tolyl, phenyl, and methyl.

The organic phosphate ligands useful for Z have a formula (R$^{23}$O)$_2$PO$_2^-$ or R$^{23}$O—PO$_3^{2-}$, where R$^{23}$ is selected from monovalent alkyl groups, alkenyl groups and aryl groups. Examples of useful alkyl groups, alkenyl groups and aryl groups are as described above for R$^{15}$. Alternatively R$^{23}$ is phenyl, butyl, and octyl.

The organic phosphite ligands useful for Z have a formula (R$^{24}$O)$_2$PO$^-$ or R$^{24}$O—PO$_2^{2-}$, where R$^{24}$ is selected from monovalent alkyl groups, alkenyl groups and aryl groups. Examples of useful alkyl groups, alkenyl groups and aryl groups are as described above for R$^{15}$. Alternatively R$^{24}$ is phenyl, butyl, and octyl.

Alternatively, Z in Formulas (IV) and (V) is independently selected from carboxylate ligands, β-diketonate ligands, nitrate ligand, sulphate ligand, and chloride ligand. Alternatively, Z includes carboxylate ligands and β-diketonate ligands.

In Formulas (IV) and (V), subscript e is a value from 0 to 3, alternatively 0 to 2, alternatively 0.

In Formula (IV), $R^7$ is an independently selected alkyl group having 1 to 18 carbon atoms, alkenyl group having from 2 to 8 carbon atoms, or aryl group having from 6 to 8 carbon atoms. Examples of $R^7$ are as described above for $R^5$.

In Formula (V), x is a value from 0.5 to 12, alternatively 1 to 9.

Examples of (B') metal salts described by Formula (IV) useful in the present method include but are not limited to zinc (II) acetate, zinc acrylate, zinc benzoate, zinc 2-ethylhexoate, calcium acetate, calcium acrylate, calcium benzoate, calcium 2-ethylhexoate, barium acetate, barium acrylate, barium benzoate, barium 2-ethylhexoate, magnesium acetate, magnesium acrylate, magnesium benzoate, or magnesium 2-ethylhexoate.

Examples of hydrated metal salts (B'2) described by Formula (VI) useful in the present method include the hydrated versions of any of the metal salts as listed above for (B'1).

Both the non-hydrated metal salts and the hydrated metal salts described above are commercially available through the major chemical vendors, such as Sigma-Aldrich, Fisher Scientific, Alfa-Aesar, Gelest.

Component (C') is a silicon-containing material having hydrolyzable groups selected from (C'1) an organosiloxane, or (C'2) a silane. In one embodiment, component (C') is at least one silicon-containing material selected from (C'1) an organosiloxane having an average formula (II) $R^5_g(R^6O)_f SiO_{(4-(f+g))/2}$ or (C'2) a silane having a general formula (III) $R^5_h SiZ'_i$, where Z' is Cl or $OR^6$, each $R^5$ is an independently selected hydrogen atom, alkyl group having 1 to 18 carbon atoms, alkenyl group having from 2 to 18 carbon atoms, aryl group having from 6 to 12 carbon atoms, epoxy group, amino group, or carbinol group, providing at least one $R^5$ groups on the (C'1) organosiloxane or (C'2) silane selected to produce the present polyheterosiloxane composition is an R' group, as defined above for the $R'_2SiO_{2/2}$ or $R'SiO_{3/2}$ siloxy units. In other words, at least one $R^5$=R' in the (C'1) organosiloxane or (C'2) silane component as described by formula (II) or (III). Each $R^6$ is an independently selected hydrogen atom or alkyl group having from 1 to 6 carbon atoms, aryl group having from 6 to 8 carbon atoms, or a polyether group having a general formula (VI) —$(R^{30})_q R^4$, where q is a value from 1 to 4, each $R^3$ is an independently selected divalent alkylene group having from 2 to 6 carbon atoms, $R^4$ is an independently selected hydrogen atom or monovalent alkyl group having from 1 to 6 carbon atoms, the subscript f is a value from 0.1 to 3, g is a value from 0.5 to 3, and (f+g) is a value from 0.6 to 3.9, h is a value from 0 to 3, i is a value from 1 to 4 and (h+i) equals 4.

The alkyl groups having 1 to 18 carbon atoms of $R^5$ in Formulas (II) and (III) are as described above for $R^1$. Alternatively, the alkyl group comprises 1 to 6 carbon atoms; alternatively, the alkyl group is methyl, ethyl, propyl, butyl, and hexyl.

The alkenyl groups having from 2 to 18 carbon atoms of $R^5$ in Formulas (II) and (III) are illustrated by vinyl, propenyl, butenyl, pentenyl, hexenyl, or octenyl. Alternatively, the alkenyl group comprises 2 to 8 carbon atoms. Alternatively, the alkenyl group is vinyl, allyl, and hexenyl.

The aryl groups having 6 to 12 carbon atoms of $R^5$ in Formulas (II) and (III) are illustrated by phenyl, naphthyl, benzyl, tolyl, xylyl, methylphenyl, 2-phenylethyl, 2-phenyl-2-methylethyl, chlorophenyl, bromophenyl and fluorophenyl. Alternatively, the aryl group comprises 6 to 8 carbon atoms. Alternatively, the aryl group is phenyl.

In Formula (II), subscript f is a value from 0.1 to 3, alternatively 1 to 3.

In Formula (II), subscript g is a value from 0.5 to 3, alternatively 1.5 to 2.5.

In Formula (II), subscripts (f+g) have a value from 0.6 to 3.9, alternatively 1.5 to 3.

Examples of the organosiloxanes (C'1) described by Formula (II) and useful in the present method include oligomeric and polymeric organosiloxanes, such as silanol-terminated polydimethylsiloxane, polymethylmethoxysiloxane, polysilsesquioxane, alkoxy and/or silanol containing MQ resin, and combinations thereof. They are made by hydrolysis of the corresponding organomethoxysilanes, organoethoxysilanes, organoisopropoxysilanes, and organochlorosilanes.

In Formula (III), each Z' is a chloro atom (Cl) or $OR^6$, where $R^6$ is as described above. Alternatively, Z' is $OR^6$.

In Formula (III), subscript h is a value from 0 to 3, alternatively, h is a value from 1 to 3, alternatively, from 2 to 3.

In Formula (III), subscript i is a value from 1 to 4, alternatively i is a value from 1 to 3, alternatively, from 1 to 2.

In Formula (III), subscripts (h+i) equal 4.

Examples of the silanes (C'2) described by Formula (III) include methyltrichlorosilane, phenyltrichlorosilane, dimethyldichlorosilane, phenylmethyldichlorosilane, methyltrimethoxysilane, phenyltrimethoxysilane, dimethyldimethoxysilane, phenylmethyldimethoxysilane, phenylsilanetriol, diphenylsilanediol, phenylmethylsilanediol, dimethylsilanediol, trimethylsilanol, triphenylsilanol, phenyldimethoxysilanol, phenylmethoxysilanediol, methyldimethoxysilanol, methylmethoxysilanediol, phenyldiethoxysilanol, phenylethoxysilanediol, methyldiethoxysilanol, methylethoxysilanediol.

In one embodiment of the present method for preparing the present polyheterosiloxane compositions Component (A') and Component (B') are reacted with water to form a mixed metal oxides solution containing M1-O-M2 oxo-linkages, and (2) then further reacting the mixed metal oxides solution with Component (C'1) or (C'2) to form the polyheterosiloxane composition, wherein the total amount of water added is between 50 and 200% of the amount theoretically necessary for the hydrolysis and condensation of all alkoxy groups and other hydrolyzable groups on Components (A'), (B'), and (C').

An amount of water must be added in each embodiment so that polyheterosiloxanes having at least two non-Si metal elements are formed. Since water can also be incorporated via the hydrated metal salts (B'2), a person skilled in the art would understand that when hydrated metal salts are utilized either smaller amounts or no additional amounts of water may need to be added in order for the needed amount of water to be present. Generally, the amount of water needed for making the present polyheterosiloxanes ranges from 50% to 200% of the theoretical amount of water necessary for complete hydrolysis and condensation of all the alkoxy and other hydrolyzable groups present on each of the components. A person skilled in the art would understand that 0.5 mole of water is necessary for hydrolysis and condensation of 1 mole of alkoxy and other hydrolyzable groups. Alternatively, the amount of water needed to make the present polyheterosiloxanes ranges from 70% to 150% of the theoretical amount of $H_2O$ necessary for complete hydrolysis and condensation of all the alkoxy and other hydrolyzable groups present on each of the components, alternatively, 80% to 120% on the same basis. Typically, the water is added slowly to ensure the metal alkoxide does not react so quickly with the water as to form a precipitate. Alternatively, one method of accomplishing this is to dilute the water with solvents. The solvents useful for diluting the water are the same as used for dispersing the components. Depending on the components used and when they are added the needed water may also be added at one time or during one or more of the steps. Other hydrolyzable groups that may be present and need to be hydrolyzed and condensed are any found on the components used, including, but not limited to, chloro.

As used herein, the term "dispersion" in the present methods means that the molecules of the various components are homogenously distributed. Each of the components may be liquid or solids and so it is preferred that they are pre-mixed or dispersed. Stirring one or more of the components in a solvent is an excellent way to get a homogeneous dispersion; or a solvent may not be needed if one or more components can be dispersed in another component. When solvents are used, any kind of solvent is useful including polar solvents, non-polar solvent, hydrocarbon solvents including aromatic and saturated hydrocarbons, alcohols. Examples of solvents useful for dispersing Components (A'), (B'), and (C') includes hydrocarbonethanol, 1-propanol, isopropanol, 1-butanol, 2-butanol, methoxyethanol, methoxyethoxyethanol, butyl acetate, toluene, and xylene, alternatively isopropanol, 1-butanol, 2-butanol, and butyl acetate. One type of solvent could be used or a mixture of different solvents would also be useful. The dispersing or mixing may be done by any conventional means such as stirring.

Generally, the reaction between Components (A'), (B'), and (C') in each of the methods proceeds at room temperature (20° C.) but if desired, elevated temperatures up to about 140° C. may be used. Alternatively, the temperature can range from 20° C. to 120° C. Generally, the reaction can take 30 minutes to 24 hours, alternatively 10 minutes to 4 hours. An optional step in all the methods comprises removing the solvent to produce the polyheterosiloxane. The solvents can be removed by any conventional manner such as heating to elevated temperatures or using reduced pressure. The polyheterosiloxane can then be redispersed in a solvent of choice such as toluene, THF, butyl acetate, chloroform, dioxane, 1-butanol, and pyridine. Since the Si—O-M linkages made by the present method can be susceptible to hydrolytic cleavage in the presence of $H_2O$, to ensure longer shelf life it is preferred to minimize the polyheterosiloxane's exposure to moisture.

The present polyheterosiloxane may be used to prepare high refractive index (HRI) coatings. The HRI coatings may be prepared by forming a film of the present polyheterosiloxane compositions, or dispersions thereof, on a surface and heating the film to form a cured coating. The time, heating means, and temperature necessary to form a cured coating may vary, but typically the film is exposed to temperatures of 70° C. to 200° C., or alternatively from 100° C. to 150° C. for at least 10 minutes, or alternatively for 30 minutes, or alternatively 2 hours.

In one embodiment, the resulting coatings have a refractive index $\geq 1.6$, alternatively $\geq 1.65$, or alternatively $\geq 1.7$.

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention. All percentages are in wt. %. All measurements were conducted at 23° C. unless indicated otherwise.

Example 1

14.50 g $ZnAc_2.2H_2O$ (Ac=acetate), 61.11 g butyl titanate polymer (BTP) used as obtained from Dupont (Dupont Corp., Wilmington, Del.), 20 g 1-butanol (1-BuOH), and 60 g toluene were charged to a 1 liter flask. A clear solution was obtained after the mixture was stirred at RT for at least 2 hours. 34.45 g $Ph_2Si(OMe)_2$ (where $Ph=C_6H_5$) was added into the flask. Under stirring a solution containing 8.80 g 0.1M HCl and 79.2 g 1-BuOH was added into the flask slowly. After stirring at RT for 50 minutes the solution was heated to 90° C. for 15 minutes and turned translucent. Then the solution was cooled to ~40° C. A solution containing 0.79 g 0.1M HCl and 7.1 g 1-BuOH was added to the flask. Total amount of $H_2O$ was 145%. The solution was heated to 90° C. again for 28 minutes. Then ~69 g solvent was distilled off. The solution was translucent after cooling to RT. Finally the solvents were removed using a rotary evaporator. The white solid with a composition of $Ti_{0.56}Zn_{0.14}D^{Ph2}_{0.30}$ was dissolved in butyl acetate at 45 wt %.

Example 2

63.6 g tetraisopropyl titanate (TPT) and 40.0 g isopropanol (IPA) were charged into a 1 liter flask. Under stirring a solution containing 6.05 g $H_2O$ and 149 g IPA was added into the flask slowly to partially hydrolyze and condense the Ti precursor. The solution was cloudy after 30 minutes. After addition of 150 g toluene the solution turned clear. 25 minutes later 26.2 g $Zr(O''Bu)_4$ (NBZ, 56 mmol) was added to the solution. Continued stirring at RT over night. The solution was cloudy and turned clear after heating to 60° C. for 30 minutes. A solution containing 4.0 g $H_2O$ and 48.5 g IPA was added to the solution to further hydrolyze and condense the Ti+Zr oligomers. A prehydrolyzed siloxane solution was prepared by mixing 29.1 g $Ph_2Si(OMe)_2$, 2.15 g 0.1M HCl, 5 g IPA, and 5 g toluene and sonicating the mixture for 10 minutes. The prehydrolyzed siloxanes solution was added to the flask and the solution turned milky after 30 minutes. Continued stirring at ~60° C. for 1.5 hour. Solvents were removed using a rotary evaporator. The product was a light yellow solid with a composition of $Ti_{0.56}Zr_{0.14}D^{DPh}_{20.30}$, soluble in many organic solvents, such as butyl acetate, toluene, THF, and chloroform. The light yellow color came from the impurities in the Zr precursor, NBZ.

Examples 3-6

Other HRI polyheterosiloxane resins (listed in the following table) were synthesized via the procedures described as example 1 or 2.

| Example | Ti precursor | 2$^{nd}$ metal precursor | Si precursor | Composition |
|---|---|---|---|---|
| 3 | Ti(OiPr)$_4$ | Ba(OiPr)$_2$ | Ph$_2$Si(OMe)$_2$ | Ti$_{0.64}$Ba$_{0.06}$D$^{Ph2}_{0.30}$ |
| 4 | BTP | Zn(OAc)$_2$·2H$_2$O | PhMeSi(OMe)$_2$ | Ti$_{0.60}$Zn$_{0.10}$D$^{Phme}_{0.30}$ Ti$_{0.64}$Zn$_{0.11}$D$^{PhMe}_{0.25}$ |
| 5 | BTP | Zn(OAc)$_2$·2H$_2$O | Ph$_2$Si(OMe)$_2$ | Ti$_{0.60}$Zn$_{0.10}$D$^{Ph2}_{0.30}$ |
| 6 | BTP | Zn(OAc)$_2$·2H$_2$O | Ph$_2$Si(OMe)$_2$ | Ti$_{0.56}$Zn$_{0.14}$D$^{Ph2}_{0.30}$ |

The invention claimed is:

1. A polyheterosiloxane composition comprising at least 70% by weight of:
   (A) a first metal (M1) selected from Ti, Zr, or Zn,
   (B) a second metal (M2) selected from a non-lanthanide metal, provided the metal selected for the second metal M2 is different from the first metal M1,
   (C) siloxy units having the formula R$^1_2$SiO$_{2/2}$ or R$^1$SiO$_{3/2}$ where R$^1$ is independently a hydrocarbon group or halogen substituted hydrocarbon group containing 1 to 30 carbon atoms,
wherein:
   the mole fraction of components (A), (B), and (C) in the polyheterosiloxane composition relative to each other is of the formula [M1]$_a$[M2]$_b$[R$^1_2$SiO$_{2/2}$]$_c$[R$^1$SiO$_{3/2}$]$_d$
   where a may vary from 0.10 to 0.7,
      b may vary from 0.001 to 0.5,
      c may vary from zero to 0.9,
      d may vary from zero to 0.9,
      with the provisos that c and d both cannot be zero, and the sum of a+b+c+d≈1,
   the polyheterosiloxane composition is soluble in an aromatic hydrocarbon solvent.

2. The polyheterosiloxane composition of claim 1 wherein the first metal M1 is Ti.

3. The polyheterosiloxane composition of claim 2 wherein the second metal M2 is Zn, Zr, or Ba.

4. The polyheterosiloxane composition of claim 1 wherein at least one of the R$^1$ groups is phenyl.

5. The polyheterosiloxane composition of claim 1 wherein the siloxy units have the formula [(C$_6$H$_5$)(CH$_3$)SiO$_{2/2}$]$_c$, [(C$_6$H$_5$)SiO$_{3/2}$]$_d$, or [(C$_6$H$_5$)(CH$_3$)SiO$_{2/2}$]$_c$[(C$_6$H$_5$)SiO$_{3/2}$]$_d$.

6. A method for preparing the polyheterosiloxane compositions of claim 1 comprising reacting:
   (A') a metal (M1) alkoxide containing Ti, Zr, or Zn,
   (B') a hydrolyzable metal (M2) salt selected from a non-lanthanide metal series of the Periodic Table, provided the metal selected for the second metal M2 is different from the first metal M1, and
   (C') a silicon-containing material having hydrolyzable groups selected from (C'1) an organosiloxane, or (C'2) a silane,
   with an amount of water that provides between 50 and 200% necessary to hydrolyze and condense the alkoxy groups and other hydrolyzable groups on Components (A'), (B'), and (C'), to form the present polyheterosiloxane compositions.

7. The method of claim 6 wherein Component (A') and Component (B') are reacted with water to form a mixed metal oxides solution containing M1-O-M2 oxo-linkages, and then further reacting the mixed metal oxides solution with Component (C'1) or (C'2) to form the polyheterosiloxane composition, wherein the total amount of water added is between 50 and 200% of the amount theoretically necessary for the hydrolysis and condensation of all alkoxy groups and other hydrolyzable groups on Components (A'), (B'), and (C').

8. A method for preparing a coating comprising:
   I) forming a film of a polyheterosiloxane composition on a surface, wherein the polyheterosiloxane composition comprises at least 70% by weight of:
      (A) a first metal (M1) selected from Ti, Zr, or Zn,
      (B) a second metal (M2) selected from a non-lanthanide metal, provided the metal selected for the second metal M2 is different from the first metal M1,
      (C) siloxy units having the formula R$^1_2$SiO$_{2/2}$ or R$^1$SiO$_{3/2}$
         where R$^1$ is independently a hydrocarbon group or halogen substituted hydrocarbon group containing 1 to 30 carbon atoms,
   wherein:
      the mole fraction of components (A), (B), and (C) in the polyheterosiloxane composition relative to each other is of the formula [M1]$_a$[M2]$_b$[R$^1_2$SiO$_{2/2}$]$_c$[R$^1$SiO$_{3/2}$]$_d$
      where a may vary from 0.10 to 0.7,
         b may vary from 0.001 to 0.5,
         c may vary from zero to 0.9,
         d may vary from zero to 0.9,
         with the provisos that c and d both cannot be zero, and the sum of a+b+c+d≈1,
      the polyheterosiloxane composition is soluble in an aromatic hydrocarbon solvent; and
   II) heating the film to form a cured coating.

9. A cured coating as prepared by the method of claim 8.

10. The cured coating of claim 9 wherein the coating has a refractive index≥1.6.

11. The method of claim 8 wherein the first metal M1 is Ti.

12. The method of claim 8 wherein the second metal M2 is Zn, Zr, or Ba.

13. The method of claim 8 wherein at least one of the R$^1$ groups is phenyl.

14. The method of claim 8 wherein the siloxy units have the formula [(C$_6$H$_5$)(CH$_3$)SiO$_{2/2}$]$_c$, [(C$_6$H$_5$)SiO$_{3/2}$]$_d$, or [(C$_6$H$_5$)(CH$_3$)SiO$_{2/2}$]$_c$[(C$_6$H$_5$)SiO$_{3/2}$]$_d$.

15. The cured coating of claim 9 wherein the first metal M1 is Ti.

16. The cured coating of claim 9 wherein the second metal M2 is Zn, Zr, or Ba.

17. The cured coating of claim 9 wherein at least one of the R$^1$ groups is phenyl.

* * * * *